United States Patent [19]

Brown et al.

[11] 4,221,515

[45] Sep. 9, 1980

[54] DECK CONTAINER RESTRAINT APPARATUS AND PROCESS

[75] Inventors: James A. Brown, Moraga; Herman E. Frentzel, Kentfield, both of Calif.

[73] Assignee: Matson Navigation Company, San Francisco, Calif.

[21] Appl. No.: 887,571

[22] Filed: Mar. 17, 1978

[51] Int. Cl.$^3$ .............. B65G 1/14

[52] U.S. Cl. .............. 410/32; 114/75; 206/216; 206/503; 206/505; 220/23.2; 220/23.6; 220/1.5; 294/67 D; 294/67 DA; 410/68; 410/78; 414/786

[58] Field of Search .............. 214/152.1 R, 12, 13, 214/14, 15 R, 10.5 R, 10; 212/11, 13–16; 114/75; 280/179 R, 179 A; 105/463, 464, 466, 476, 486, 487, 373; 294/67 D, 67 DA, 67 DB, 81 SF, 116 R, ; 206/595, 821, 503, 509, 505, 216; 220/4 C, 4 D, 1.5, 23.2, 23.6; 414/786, 136–139; 410/32, 68, 71–86, 90, 91

[56] References Cited

U.S. PATENT DOCUMENTS

| | | | |
|---|---|---|---|
| 2,425,421 | 8/1947 | Deily | 294/67 DB |
| 3,081,120 | 3/1963 | Heinmiller et al. | 214/10.5 R X |
| 3,083,670 | 4/1963 | Harlander et al. | 214/15 R X |
| 3,536,351 | 10/1970 | Zweifel et al. | |
| 3,543,951 | 12/1970 | Marvin | 214/10.5 R |
| 3,734,308 | 5/1973 | Pasternack | 214/10.5 R |
| 3,776,169 | 12/1973 | Strecker | 214/10.5 R X |
| 3,885,676 | 5/1975 | Wilson et al. | 294/67 DA X |
| 3,897,098 | 7/1975 | Haertig | 294/81 SF |
| 3,899,205 | 8/1975 | Lanigan et al. | 294/67 DA X |
| 3,980,185 | 9/1976 | Cain | 214/10.5 R |

*Primary Examiner*—Frank E. Werner
*Attorney, Agent, or Firm*—Townsend and Townsend

[57] ABSTRACT

A deck container restraint system is disclosed which unitizes discrete containers against vertical movement in modules of three-wide, typically four-high stacks or columns to prevent overboard loss due to static and dynamic load conditions experienced at sea. A three-wide, one-high bottom tier of containers is secured against side to side and vertical movement by deck cones having locking devices. The overlying three-wide second tier is secured against side to side and vertical movement by cones having locking devices at the top of the first tier. Finally the three-wide, two-high top third and fourth tiers of containers are loaded, first by being tied vertically together by cones having locking devices and second, by being lifted in vertically tied pairs onto stacking fittings at the second-third tier interface. The stacking fittings restrain side to side movement at the second-third tier interface only. Upon completion of placement of the third and fourth tier, an equalizing spreader fits over the top of the three-wide, four-high container columns or stacks, restraining relative vertical and horizontal movement between the corners of adjacent containers. By providing for remote fastening of the equalizer to the top of the three-wide, four-high module, container restraint against dynamic loadings commonly experienced at sea can occur without conventional horizontal or vertical ties. Provision is made to expand the module to container columns on either side if additional equalizer spreaders are used.

12 Claims, 10 Drawing Figures

DECK CONTAINER RESTRAINT APPARATUS AND PROCESS

This patent application relates to a system of deck container restraint and specifically to an apparatus and process for producing container restraint against dynamic movement of a ship at sea, which might otherwise cause the containers to fall overboard.

STATEMENT OF THE PROBLEM

A deck loaded container on a rolling and pitching ship at sea has forces acting on it which tend to topple the container over the side. These forces can conveniently be broken into static and dynamic forces.

Regarding the static forces, these forces are nothing more nor less than those which would act upon the container on any inclined surface, assuming that there was no motion. Regarding the dynamic forces, these forces are those which are generated by the accelerations and decelerations (primarily in roll) as the vessel rolls at sea. Assuming that the ship rolls about a constant center of roll, the dynamic forces increase as the distance of the container increases from the roll center of the vessel. The top containers on a stack of containers are subject to the highest dynamic loading.

Thus, the problem to which this invention is addressed is the prevention of deck stacked container cargo from falling overboard due to static and dynamic forces.

As standard cargo containers are rectangular in section, their tendency to roll overboard requires two discrete movements of the upper corners of the rectangular section away from the deck on which the container is loaded. One movement is an upward movement. That is, where a container actually in fact starts to roll away from the deck and pass over the side of the vessel, one corner of the container must in fact move upwardly. If this upward movement is prevented, rolling of the container into the sea can likewise be prevented.

Alternately, the upper corners of the container must move to the side. Likewise, if this side movement is prevented, container movement overboard and into the sea can likewise be prevented.

To understand some of the loading phenomena present on deck loading cargo containers, reference may be had to FIGS. 1A and 1B.

Assuming that a ship rolls to port, it will be seen that container $C_{11}$, in the absence of any cone-type fitting, will be subject to horizontal movement. Typically, the container will tend to slide over the port side of the vessel. To prevent such movement deck cones are utilized. These deck cones restrain the horizontal movement only; the container $C_{11}$ being held by deck cones can be freely lifted from the deck.

While the vessel is undergoing motion at sea, and assuming the vessel rolls radically to port, container $C_{11}$, if restrained from horizontal movement only, will tend to roll overboard. In such an overboard roll the container will pivot about the outboard port deck cones and raise from the inboard deck cones. Assuming that the ship movement (preferably in roll) is radical enough, overboard toppling can occur.

To restrain such rolling motion the deck cones are provided with vertical locking devices. Alternately, "twist lock" fittings can be provided. Either of these combinations restrains vertical movement between the container corner casting and the ship's deck. The container is thus held to the deck and overboard rotational toppling of the container prevented.

It will be noted that the container $C_{11}$ must be restrained against vertical movement typically at both sides, port and starboard. Moreover, where the container is a deck load at either of the longitudinal extremes of a vessel (box or stern), pitching and heaving of the vessel under adverse conditions can vertically dislodge the container. Thus, cones with vertical locking devices or twist lock fittings prevent vertical and rotational dislodgement of deck loaded containers.

Referring briefly to FIG. 1B, the phenomenon known as "racking strength" can be understood. It will be noted in FIG. 1B that a container $C_{21}$ has been placed on top of a container $C_{11}$. Container $C_{11}$ forms the foundation and base for securing container $C_{21}$ to hatchcover B. Where the ship undergoes static or dynamic loading, container $C_{11}$ thus forms the foundation members for any overlying column of containers placed on it. When the forces which can cause the collapse of container $C_{11}$ are analyzed, one of the principle modes of collapse is a parallelogram type deformation of the rectangular sides or ends of the container. As a practical matter, such collapse usually occurs at the ends.

It has been found that when the vessel proceeds to sea, such collapse can and does occur. Thus, containers are carefully designed to resist such parallelogram type collapse within specific limits. This ability of the containers to resist the parallelogram type collapse at their respective ends is typically referred to as the "racking strength" of the containers. As will hereinafter more fully appear, the invention utilized herein assumes a degree of "racking strength" for the container secured as deck loaded cargo.

SUMMARY OF THE PRIOR ART

One of the most common systems known is a lashing system utilizing vertical and/or diagonal wire rope lashing. In this type of container restraint system, each of the stacked columns of containers are vertically tied to the deck by a vertical or diagonal tensioning system. Typically, cables from the top of each stack of containers are tied to the deck, and stacking fittings or cones are used between tiers. This system has disadvantages in that many fittings are required, workmen must work high off the deck to lash the containers, and the cables themselves must be constantly adjusted at sea.

Buttress systems also are used, typically to prevent horizontal side to side movement of stacks of containers. In these systems, large buttresses are vertically cantilevered up from the deck in typical vertical spaced apart alignment. Typically, the buttresses secure "mats" upon which discrete layers of containers rest. These systems have disadvantages in that they require many discrete parts and manipulations in order to stack the cargo. Moreover, the buttresses themselves require extensive vessel modification and do constitute vertically extending barriers, which barriers constitute obstacles during loading the vessel. The buttress type systems are extremely limited in handling containers of different height and different length.

Corner lock systems are known. Typically, these container corner lock systems lock the eight blocks or castings at the rectangular corners of the containers together to immediately vertically adjacent containers. As such corner lock systems are entirely dependent on the overall structural strength of the locked together containers, they can typically extend only two container high columns without supplemental lashings, unless container weights are minimal. Moreover, a number of fittings and individual adjustments are required. Labor in securing such systems is relatively high.

Fixed open cells placed on deck, similar to the fixed open cells found in the holds of such container ships, have been used. However, such systems restrict the below deck access through loading hatches unless special hatch covers and cell guide arrangements are provided. As a consequence, such fixed open cells are usually mounted over spaces where below deck access is not normally required. For example, they are found over engine room spaces, crew quarters and the like.

Super container systems have been proposed. Broadly, a large and portable structure has placed within it a plurality of containers. This large and portable structure effectively ties all the containers placed within it into a module. This system has its disadvantage in that the transport and storage of the structural member tying all the groups of containers together is extremely space consuming and awkward. Given the premium to which dock side space is assigned, it is not possible to economically store large bulky super container storage units, especially when they are in the empty state.

SUMMARY OF THE INVENTION

A deck container restraint system is disclosed which unitizes discrete containers against movement in modules of three-wide, typically four-high stacks or columns to prevent overboard loss due to static and dynamic load conditions experienced at sea. A three-wide, one-high bottom tier of containers is secured against side to side and vertical movement by deck cones having restraining devices. The overlying three-wide, one-high second tier is secured against side to side and vertical movement by fittings with restraining devices at the top of the first tier. Finally the three-wide, two-high top third and fourth tiers of containers are loaded, first by being tied vertically together by fittings with restraining devices and second, by being lifted in vertically tied pairs onto stacking fittings at the second-third tier interface. The stacking fittings restrain side to side movement at the second-third tier interface only. Upon completion of loading the third and fourth tier, an equalizing spreader fits over the top of the three-wide, four-high container columns or stacks, restraining relative vertical and horizontal movement between the corners of adjacent containers. By providing for remote fastening of the equalizer to the top of the three-wide, four-high module, container restraint against dynamic loadings commonly experienced at sea can occur without conventional horizontal or vertical ties. Provision is made to expand the module to container columns on either side.

OTHER OBJECTS AND ADVANTAGES

An object of this invention is to disclose a deck container restraint system and apparatus which gives modules of typically three-wide, at least three-high tiers of containers resistance to the static and dynamic forces experienced at sea without overboard loss. Typically, a three-wide bottom tier of containers is secured against horizontal and vertical movement by deck cones with vertical locking devices. A three-wide, side by side intermediate tier of containers is loaded onto stacking fittings at an interface on the top of the bottom tier. A three-wide top tier of containers is loaded onto stacking fittings at the interface on the top of the intermediate tier. The stacking fittings restrain side to side movement only. At least one interface is secured by locking devices at the stacking fittings against vertical movement. Upon completion of the top tier, an equalizer spreader fits over the top of the three-wide, at least three-high container module fastening to the uppermost tier at the top corners of all containers in the top tier. This equalizer restrains relative vertical, horizontal and rotational movement between the corners of the adjacent side by side containers to secure the containers.

An advantage of this container restraint process is that it can extend either to three-high or four-high, three-wide modules. Moreover, assuming that groups of modules are stacked in a side by side basis, intermediate columns placed between group modules can likewise be stabilized. For example, in an illustrated eleven across, four-high row of containers, outboard modules of twelve containers each in combination with an intermediate module of twelve containers can stabilize therebetween two discrete container columns, which columns are located between modules.

A further advantage of this invention is that a process of loading is disclosed which reduces the labor required for loading or discharge of containers. Specifically, a minimum of loose and moving pieces is utilized. Moreover, the equalizing spreader herein disclosed is an automated piece of equipment which remotely fastens on an above deck basis to the uppermost portions of the stacks.

Yet another advantage of this invention is that the system disclosed herein is relatively insensitive to the failure of one element. For example, where one container is damaged and collapses, a domino effect and container overboard loss are held to a minimum.

Yet another advantage of this invention is that it has a minimum obstructing effect on hatchcovers. Once the disclosed equalizer is removed from the top of the stack and the containers unloaded off a hatchcover, immediate access to the hold of the vessel can occur.

Yet another advantage of this invention is that it has "length flexibility". By the simple expedient of using different length equalizer beams, stacks of side by side containers in differing discrete lengths can be stabilized against overboard roll.

Yet another advantage of this invention is that the working elevation for longshore loaders is restricted. Typically, men are only required on the first and second tier of containers. As to the third and fourth level of containers, loading is completely remote. The system is therefore safer as falls from the third and fourth tiers of containers can be minimized. Dropping of equipment to the deck below is minimized.

Yet another advantage of this invention is that no adjustment is required at sea. Constant tensioning of discrete elements, required in either vertical or diagonal cabling systems, is avoided.

Still another advantage of this invention is that a minimum of restructuring of the deck is required. Elaborate internal hull modification, due to the fastening of buttresses and the like, is avoided.

Yet another object of this invention is to disclose an automated equalizer spreader. According to this aspect of the invention, a three container wide unit is disclosed. This unit can be loaded on top of a stack of containers by conventional lifting spreader equipment. As it is loaded, the unit is placed in a state where it is ready to grasp the corners of the discrete containers. Once the unit is released from a conventional loading spreader, automated grasping of the container corners occurs. Finally, the unit at its corners is adapted to stabilized adjacent containers on either side of the three-wide stack. Provision is made for nesting of the equalizer units, facilitating their storage.

An advantage of this aspect of the invention is that the automatic engagement and disengagement of the equalizers with the containers avoid the necessity of having workers present when the equalizer is placed. Thus, the possibility for workers to be injured (either by falls in attending equipment already placed or in guiding the equalizer equipment into place) is non-existent.

A further advantage of the disclosed equalizer system is that there can be variations in the height of side by side containers. Thus, containers of varying heights can be utilized and stabilized against overboard roll to either side of the container module.

Yet another advantage of this invention is that container loading can occur in vertically tied container pairs, crane moves can be minimized.

Other objects, features and advantages of this invention will become more apparent after referring to the following specification and attached drawings in which.

Figure 1A:
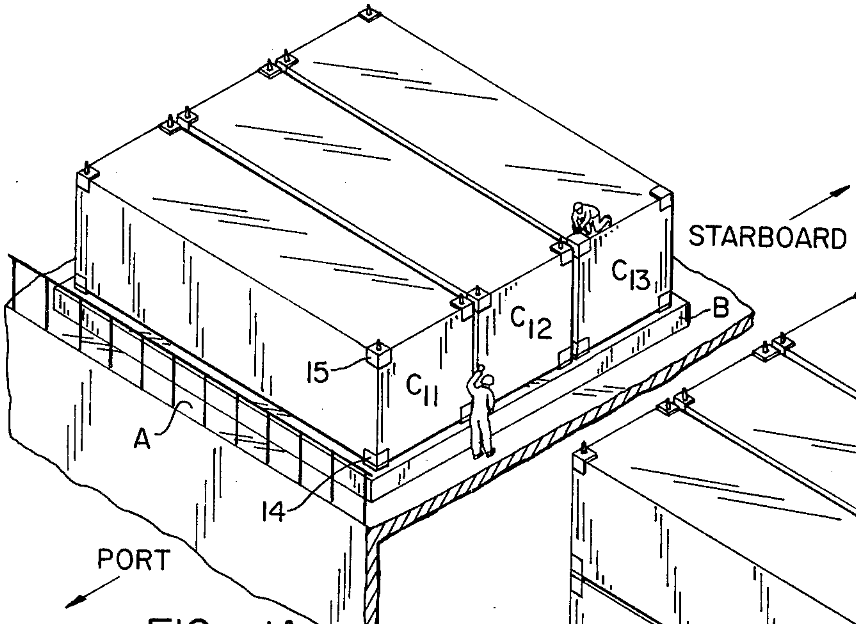
FIG. 1A is the portion of a view illustrating the first tier of containers being placed.

Referring to FIG. 1A, the weather deck A of a vessel, preferably a container ship, is illustrated having a hatchcover B providing the base for a three-wide, four-high stack of containers C. Each of the discrete columns of containers is shown with its base container unit in place. Longshoremen are illustrated locking deck cones 14 and installing cones 15. Deck cones 14 with their locking device secure the respective containers C against up and down movement, as well as side to side movement, and effect a positive lock between hatchcover B and each of the containers C.

Stopping at this juncture, a numbering system for identifying containers may be convenient. Therefore, containers in the first tier will be collectively referred to as $C_{10}$ and individuably referred to as $C_{11}$–$C_{13}$. The first container on the left will be referred to as $C_{11}$, the intermediate container as $C_{12}$, and the righthand container as $C_{13}$. Overlying tiers will be correspondingly identified.

Figure 1B:
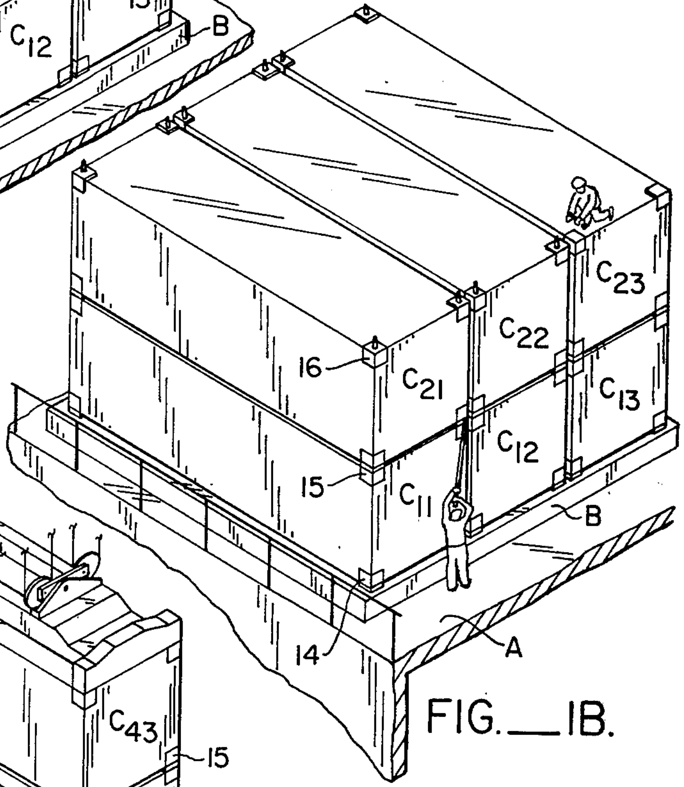
FIG. 1B is a cartoon view illustrating the second tier of carton containers in place with a typical fastening occurring at the interface between the first and second tier of containers.

Referring to FIG. 1B, an overlying row of three-wide containers $C_{21}$–$C_{23}$ has been installed in place. Cone fittings 15 are being locked with known vertical locking devices by a longshoreman to prevent relative side to side and up and down movement between $C_{10}$ and $C_{20}$ rows of containers. At the uppermost portion of the then existent stack, a longshoreman is placing cone or stacking fitting 16. Cone fitting 16 resists side to side movement between containers only and has no vertical locking devices. However, the containers are free to move upwardly and downwardly. Thus, once the cone fittings 16 are in place, no further manual adjustment on top of the horizontal row $C_{21}$–$C_{23}$ tier of containers is required.

Figure 1C:
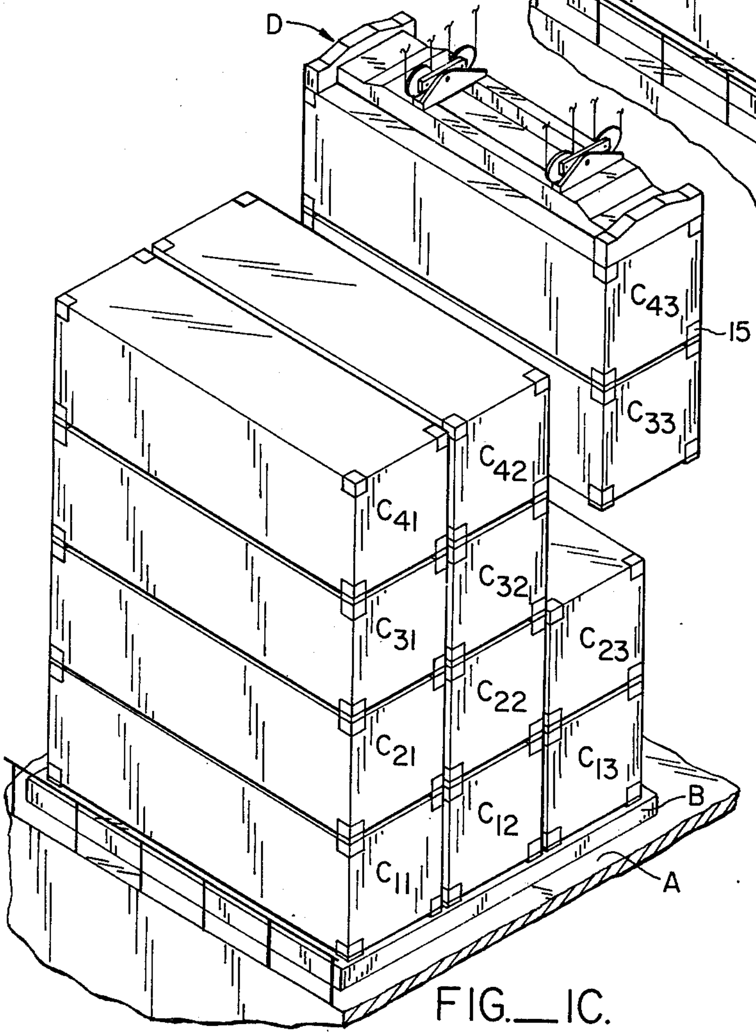
FIG. 1C is a cartoon series illustrating the placement of the third and fourth tiers of containers.

Referring to FIG. 1C, lifting spreader D is illustrated, adding the final containers $C_{43}$, $C_{33}$ to the module. These containers are tied together in vertical pairs as specifically illustrated in the vertical pair $C_{43}$, $C_{33}$. Such tying occurs by cones with locking devices 15, which cones 15 are typically installed shoreside in a manner precisely analogous to that illustrated in FIGS. 1A, 1B. The vertical pairs $C_{41}$, $C_{31}$; $C_{42}$, $C_{32}$; and $C_{43}$, $C_{33}$ are placed on top of cone fittings only. No vertical coupling is made at the interface between the second and third tier of containers.

Figure 1D:
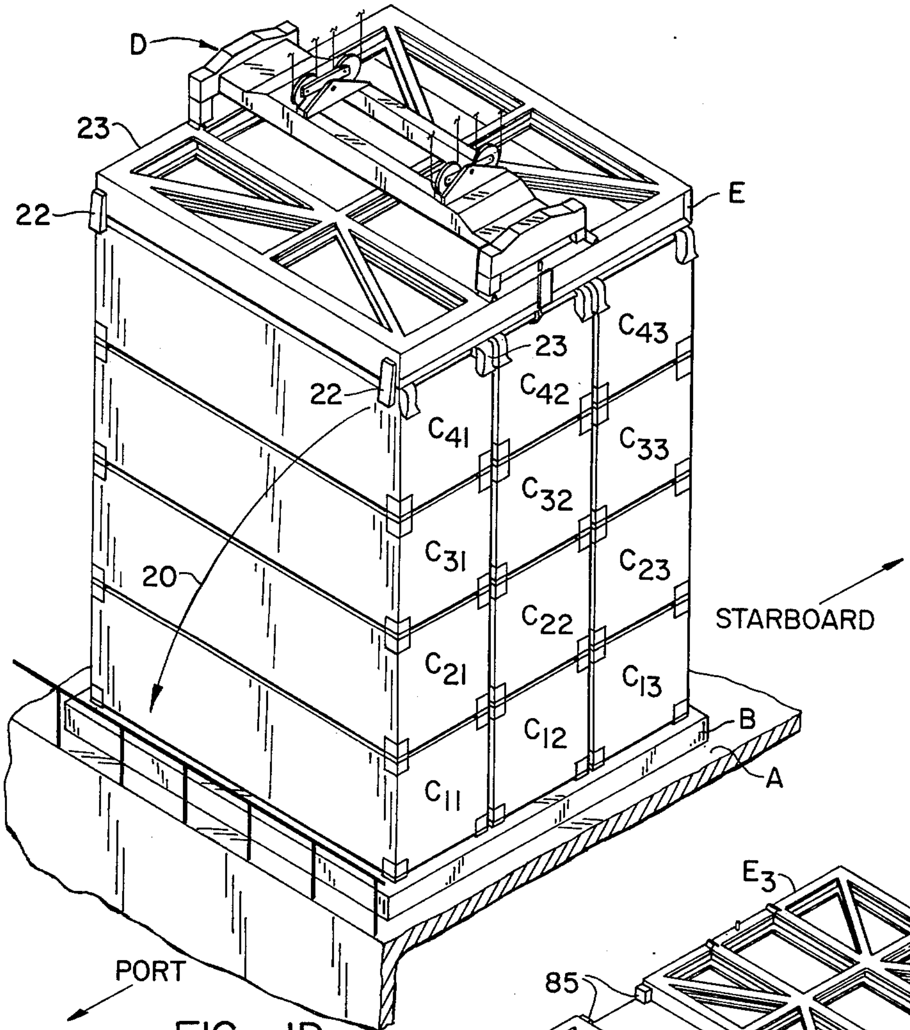
FIG. 1D illustrates the placement of an equalized beam on top of all the containers by a conventional lifting spreader, with release of the spreader not yet shown.

Finally, and referring to FIG. 1D, spreader D is illustrated placing an equalizer E onto the containers. Typically, equalizer E remotely fastens to the upwardly exposed edge of containers $C_{41}$–$C_{43}$. When spreader D releases equalizer E, equalizer E automatically locks to the top corners of containers $C_{41}$–$C_{43}$. When such locking occurs, equalizer E prevents relative horizontal movement and relative vertical movement between the respective corners of the containers $C_{41}$–$C_{43}$. As such, it provides the only horizontal tie between the discrete columns of stacked containers.

As will hereinafter be more fully explained, equalizer E is fully remote in its attachment to the top of the container stack. Moreover, it will be seen that there is no vertical tie from the top of the equalizer E down to the deck. Thus, the system of containers standing herein is self supporting.

The function of the equalizer E is not immediately obvious; an explanation is therefore required.

Assuming the vessel rolls to port as indicated by arrow 20, FIG. 1D, the dynamic action of the corners of container $C_{41}$ can be discussed. For purposes of the following discussion it will be assumed that a container is about to tumble over the port side of a vessel due to a high degree of port roll.

Typically, container $C_{41}$ at its upper port corners 22 will rotate outboard with the initial movement being horizontal. In such rotation outboard a decreasing distance will occur between the plane of hatchcover B and the upper port corners of container $C_{41}$. This rotational movement, if unrestrained, will permit at least container $C_{41}$ to fall overboard to port.

However, container $C_{41}$ at its upper starboard corners 23 will undergo a rotational movement having an initial vertical movement with respect to the plane of hatchcover B. This vertical movement will increase the distance between hatchcover B and corner 23.

Noting this much, the primary function of the equalizer can now be understood. Specifically, since all the containers $C_{41}$–$C_{43}$ are tied to the equalizer, force of overboard toppling due to the port roll will be combatted in two ways.

First, unless all the containers $C_{41}$–$C_{43}$ (and the corresponding vertically tied containers $C_{31}$–$C_{33}$) move simultaneously to port together, none of the containers may so move. Thus, horizontal movement of the discrete container $C_{41}$ is resisted, unless all the containers $C_{41}$–$C_{43}$ (and $C_{31}$–$C_{33}$) may likewise move.

Secondly, as equalizer E has tied to it the full weight of containers $C_{31}$–$C_{33}$ and $C_{41}$–$C_{43}$, vertical movement of corner 23 of container 41 will be resisted. Specifically, unless the forces at corner $C_{23}$ can lift the weight of the underlying containers, no overboard rolling will occur.

Since during the port roll, horizontal movement of corner 22 is restricted and both horizontal and vertical movement of corner 23 on container $C_{41}$ is restricted, overboard or falling movement is resisted. The result is a unique stabilization. It will be noted that the stabilization here achieved depends upon the "racking strength" of the stabilized containers. Therefore container gross weights must be controlled.

It is important to note that there are no vertical ties from the top of the equalizer E to the deck A or hatchcover B. Moreover, it is equally important to note that no longshoremen have worked higher than the tops of containers $C_{21}$–$C_{23}$. In the system herein disclosed the three-wide, four-high stacking in columns of containers has been stabilized by the equalizer E in the preferred embodiment of the invention.

It is noted that the preferred embodiment of this invention includes a module of containers, three-wide, four-high. The container module is preferably always three or more containers wide and at least includes three tiers of height. Moreover, it is preferred that each tier be rectangular in section—and not square. Preferably the long side of the rectangular section should be disposed on a horizontal axis, and short side of the rectangular section should be disposed on a vertical axis.

Figure 2:
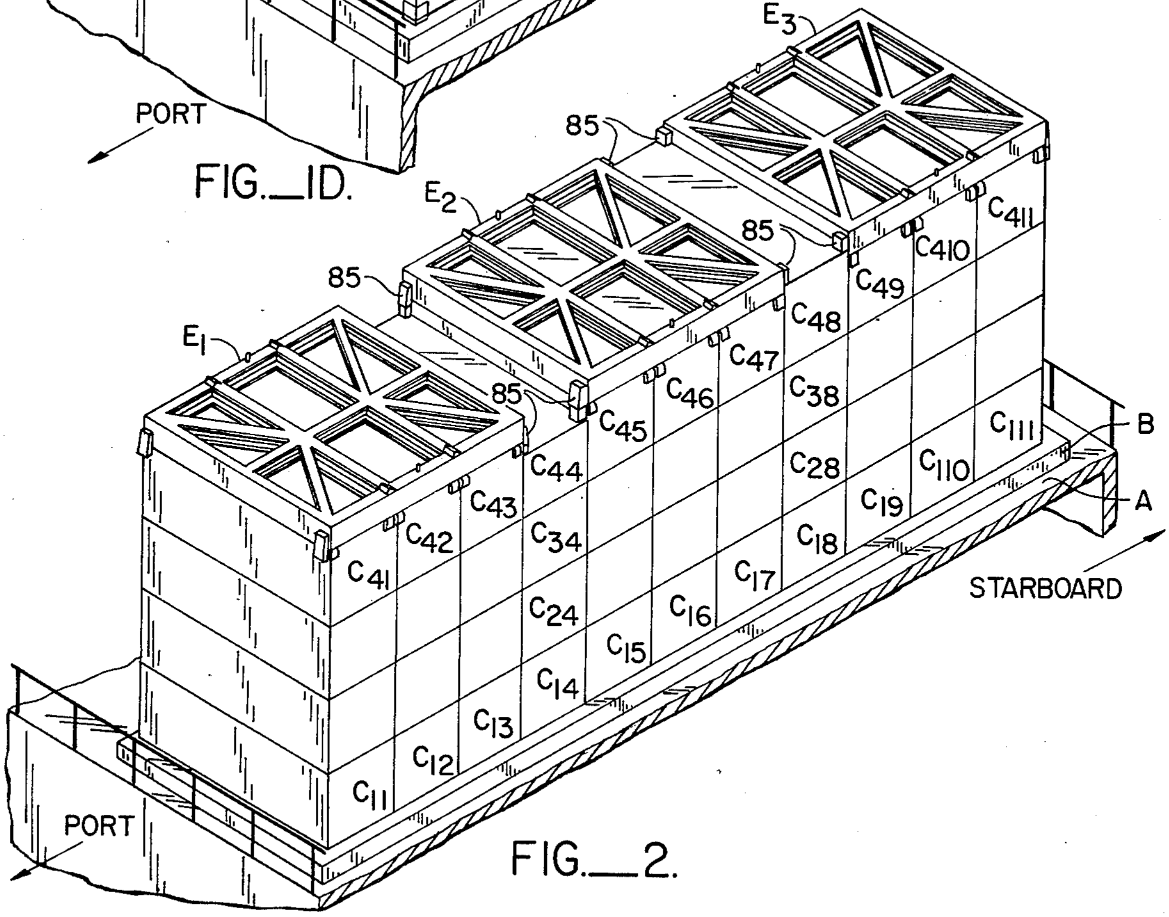
FIG. 2 is a schematic of a loaded stack, illustrating the both vertical and side to side restraints placed on a group of four-high, eleven-wide column of containers.

Referring to FIG. 2, three equalizers $E_1$, $E_2$, $E_3$ are shown stabilizing an eleven wide row of containers. Typically, this row of containers extends from the port side of a vessel to the starboard side of a vessel. Referring to FIG. 2, three important aspects may be noted.

First, it will be noted that the equalizers fit on top of modules of twelve containers each.

Secondly, it will be noted that each of the modules constrains therebetween a single discrete column of stacked containers. For example, the modules under equalizers $E_1$ and $E_2$ constrain therebetween a column of containers consisting of containers $C_{14}$, $C_{24}$, $C_{34}$, and $C_{44}$. Likewise, the modules under equalizers $E_2$ and $E_3$ constrain therebetween a column of containers $C_{18}$, $C_{28}$, $C_{38}$ and $C_{48}$.

Finally, it will be noted that the heights of the container modules can vary (although the top of the uppermost tier must be in a common plane under any one of the equalizers E). Likewise, the column of containers, including container $C_{44}$, can be at a different elevation with respect to the containers under equalizers $E_1$ and $E_2$. Likewise, the column of containers commencing with container $C_{48}$ can be at a differing elevation from the containers under equalizers $E_2$ and $E_3$. Similarly equalizers, such as $E_2$ and $E_3$, can be at different levels.

Having set forth the unique stabilizing function of this invention, the construction of the equalizer can now be set forth. The overall construction of the equalizer will first be discussed. Secondly, the function of the equalizer in grasping the containers will be specified as actuated by lifting spreader D. The nesting of a plurality of equalizer E's will be set forth. Thereafter, the function of side by side equalizers E in stabilizing intermediate rows of containers will be set forth.

Figure 3:
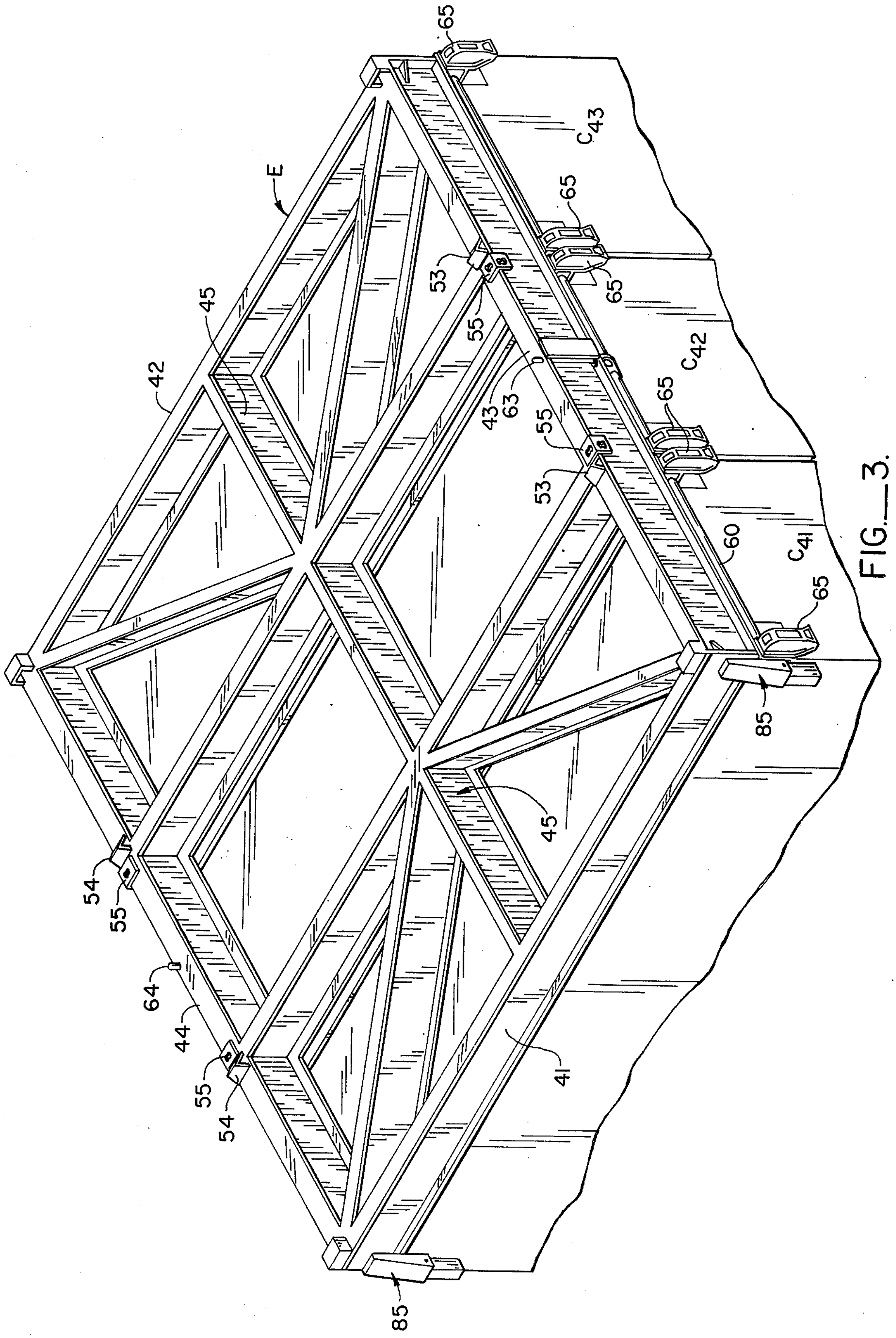
FIG. 3 is a perspective of the equalizer utilized with this invention loaded on containers and limiting relative vertical and horizontal movement between containers.

Referring to FIG. 3, the construction of the equalizer can be discussed. Equalizer E includes sides 41 and 42 with ends 43 and 44. In overall section, the sides are of a dimension wherein they fit on the tops of containers $C_{41}$–$C_{43}$. Appropriate cross-bracing 45 braces the respective sides of the equalizer.

The sides and ends 41–44 and the cross-bracing 45 are fabricated from steel structural members, such as I-beams, joined in a conventional manner. Structurally the equalizer is strong enough to prevent relative movement between any of the containers $C_{41}$–$C_{43}$. However, it is important to note that the equalizer need not be sufficiently strong to lift all of the containers. It may not act as a lifting spreader and is to be distinguished from such devices. Indeed, and as will hereinafter more fully appear, when the equalizer E is grasped itself by a lifting spreader, one of its principle functions is to release all underlying containers. Thus, as distinguished from a lifting spreader, the equalizer here illustrated only grasps the respective containers $C_{41}$–$C_{43}$ at their upper corners when the equalizer is not itself being lifted. When the equalizer of the preferred embodiment itself is being lifted, automated release of the underlying containers occurs.

Referring again to FIG. 3, the automated container attachment-release mechanism can be seen. Specifically, and at each of the end members 43, 44 of the equalizer there resides a pin or rod 63 being shown in the medial portion of end member 43, and a pin or rod 64 being shown in the medial portion of end member 44. As will hereinafter become more fully apparent, pins 63 and 64 have two functions. First, they effect latching of each of the container hook mechanisms 65. Secondly, pin 63 also actuates outside hold downs 85. Hold downs 85 are illustrated specifically in FIGS. 2 and 3; the construction and operation of hold downs 85 will be delayed until discussion of FIG. 7.

Regarding latch mechanisms 65, these mechanisms are fastened to and supported by equalizer E in arrays of four for restraining each container. Likewise, each array of four is supported by said frame to restrain relative movement of each container relative to the remaining containers grasped by equalizer E.

Referring to FIG. 3, gathering surfaces 53 and 54 are shown. These surfaces center a spreader D in its descent upon the equalizer E and serve to protect rods 63 and 64 from being bent or damaged during spreader engagement with the equalizer. Typically, spreader D engages castings 55 at top or end apertures for lifting in the same manner as apertures on a container casting are grasped.

Figure 5:
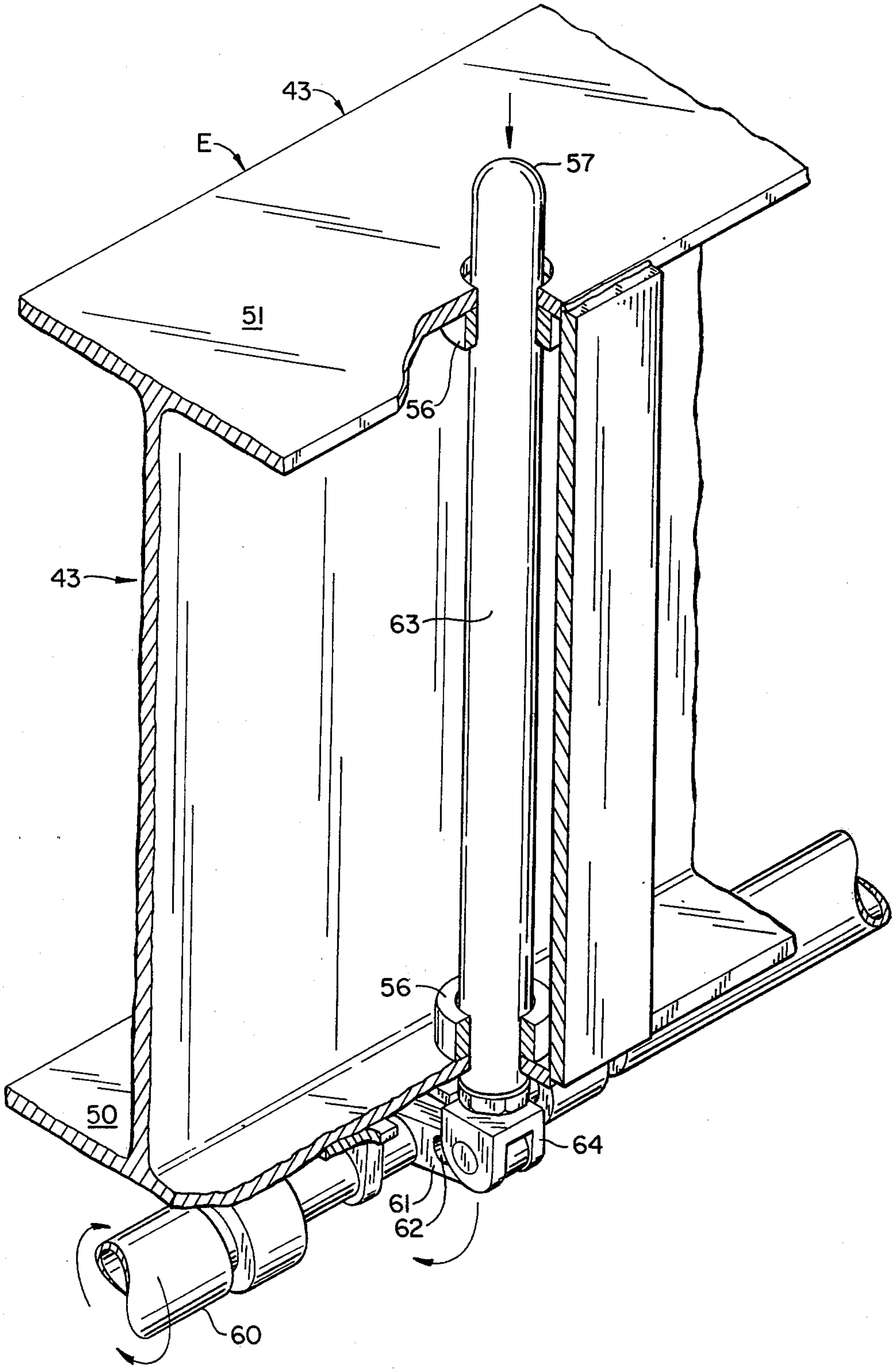
FIG. 5 is an enlarged perspective showing the lifting spreader actuated pin and its crank mechanism for selectively and remotely engaging or disengaging containers.

Referring to FIG. 5, pin 63 attached to end member 43 is illustrated. Specifically, the upper and lower flanges 51, 50 of I-beam 43 are transpierced and reinforced by rings 56. These respective rings have registered therethrough pin member 63. Pin 63, in the upward position at end 57, bears upon a spreader which tends to pick or lift equalizer E. When a spreader is against pin 63 at end 57, the pin is depressed downwardly.

Figure 6:
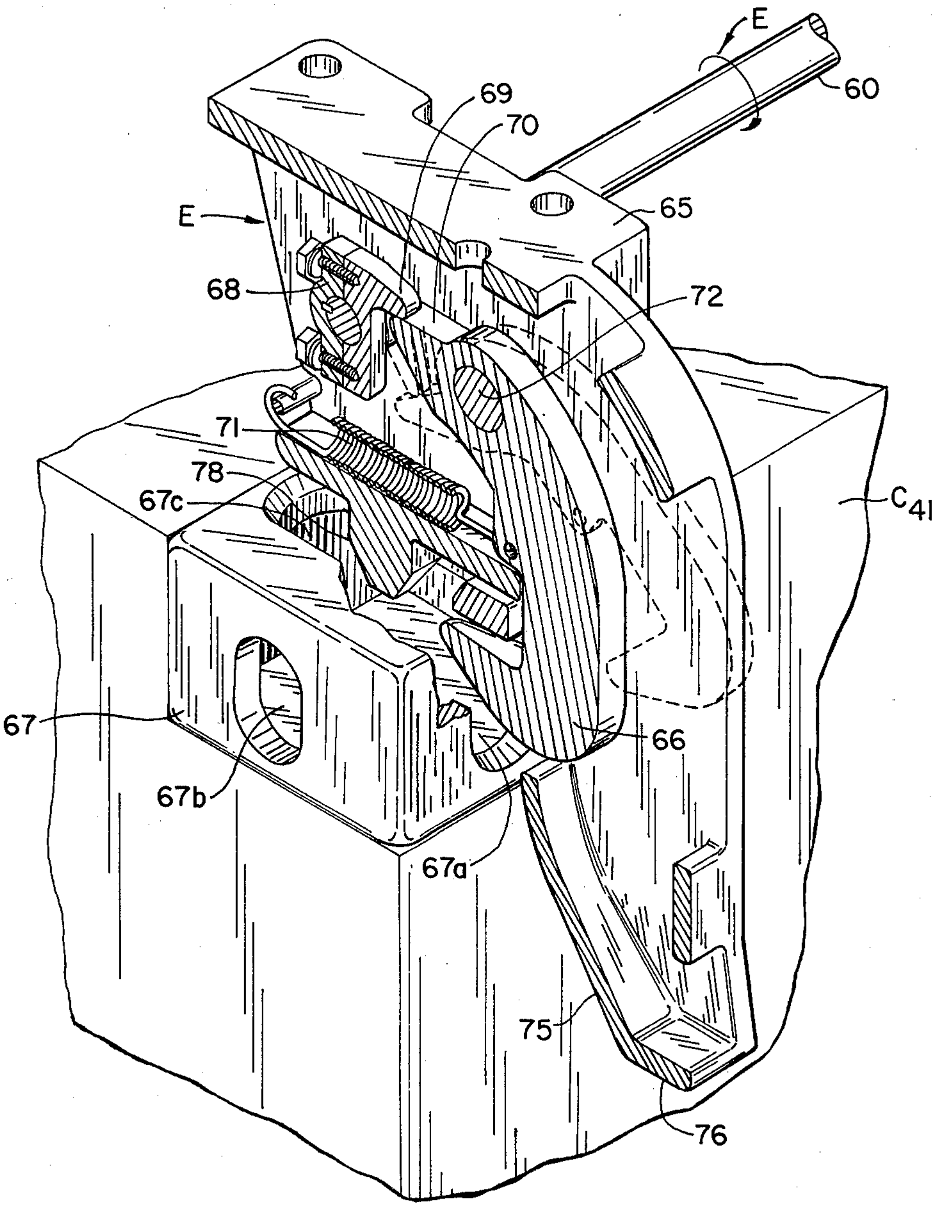
FIG. 6 is an enlarged perspective in the scale of FIG. 5 showing the equalizer guide and hook assembly for hooking into the corner casting blocks of containers.
Figure 7:
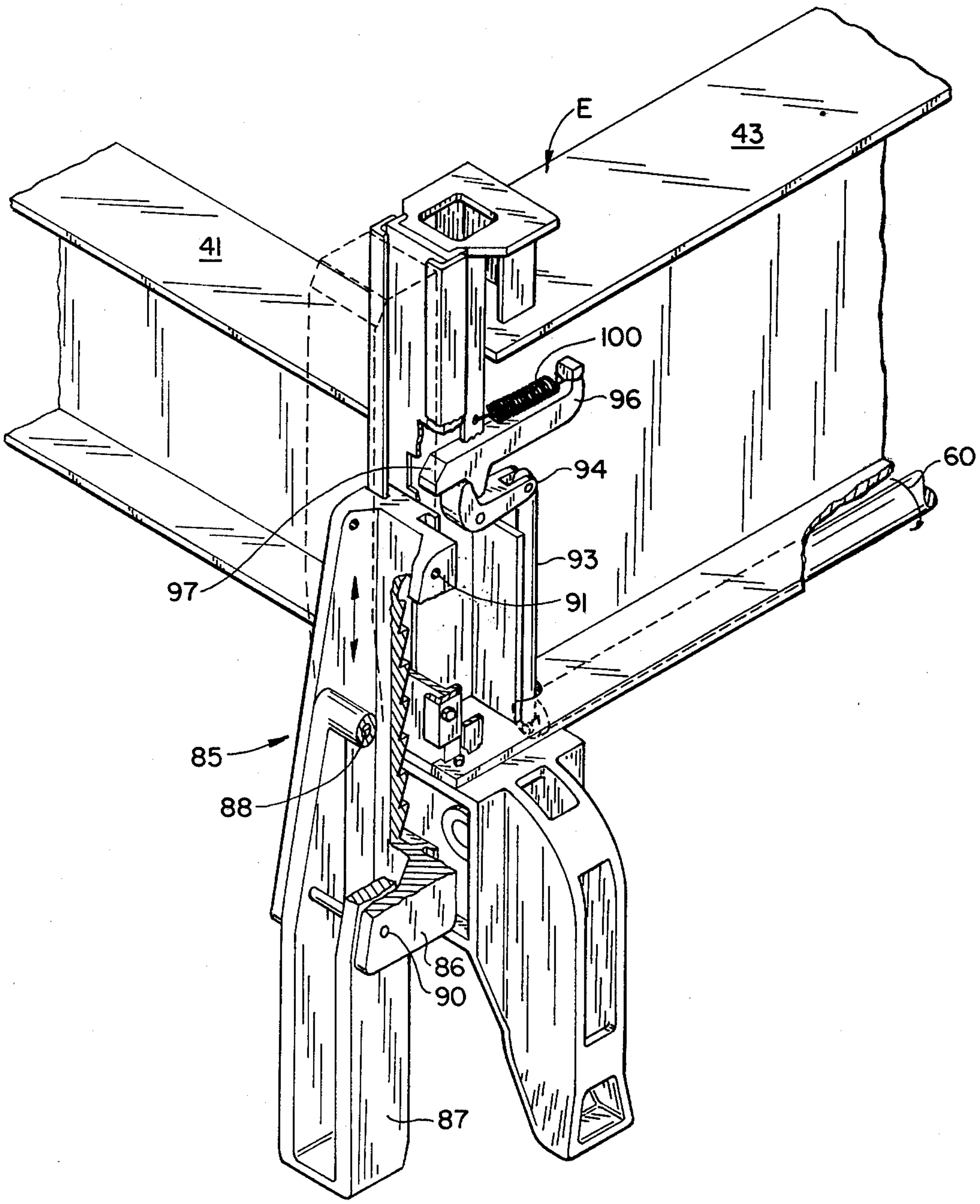
FIG. 7 is a perspective view of a depending member for engaging containers of the same or varying heights placed immediately adjacent to the three-high, four-wide modules.

A shaft 60 extends parallel to each of the end members 43, 44 (see FIGS. 3, 4, 5, 6 and 7). Referring specifically to FIG. 5, a crank 61 with an eccentric slot 62 is connected at a clevis 64 to the lower end of pin 63. Thus, upward and downward movement of pin 63, caused by overlying spreader D contacted at end 57, causes rotation of shaft 60. This shaft rotation may thereafter be used to effect latch mechanism 65 operation, as illustrated in FIG. 6, or hold down 85 operation, as illustrated in FIG. 7.

Referring to FIG. 6, shaft 60 is illustrated rotatably mounted (by bearings not shown) to the illustrated fragment of an equalizer E in the vicinity of a typical latch mechanism 65. The latch mechanism 65 includes a C-hook 66, which penetrates into and out of an end aperture **67*a* of corner casting 67 of a container, the particular container herein illustrated being container $C_{41}$. Shaft 60 rotates (clockwise in the view of FIG. 6). When actuated by rod 63, shaft 60 has a shaft attached pawl 68. Pawl 68 has in turn a surface pawl 69. Pawl surface 69 rotates downwardly on a complimentary pawl 70 protruding from pivotally mounted C-hook 66. Hook 66 is pivotally attached to latch mechanisms 65 at a shaft 72 in the upper portion of C-hook 66. In such pivotal movement, C-hook 66 pivots from a first position, shown in solid lines, to a second position, shown in broken lines against the bias of a tension coil spring 71. In such pivotal movement C-hook 66 retracts clear of and disengages from end hold 67*a* in a corner casting 67**.

Assuming that a spreader for lifting the equalizer E contacts pin 63, shaft 60 rotates. C-hook 66 thus pivots out of penetration from end aperture **67*a* of the corner casting 67. The corner of container $C_{41}$ is released from the latch mechanism 65**. The equalizer E can thus be lifted free at this particular latch mechanism.

Operation of the other latch mechanisms 65 is analogous and simultaneous; all latch mechanisms are operated together by rod 63.

In actual fact, any actuating spreader D will have some play with respect to any object if lifts, including an equalizer E. Therefore, the movement of the C-hook 66 is usually designed with some tolerance. For example, a first and outermost movement of C-hook 66 may occur when the full weight of the lifting spreader rests on the equalizer. When the equalizer E is being lifted by a spreader D, a small clearance between spreader D and equalizer E develops. Rod 63 may reciprocate upwardly for a small part of its vertically reciprocal motion. As a consequence, C-hook 66 may tend to swing a small amount towards corner casting 67. However, the linkage mechanism is designed so that when equalizer E is being lifted free and clear of the container 41, the C-hook 66 is still in the disengaged position.

It will be noted that C-hook 66 extends into the latch mechanism at the end aperture **67*a* of casting 67. Extension into the side aperture 67*b* is not preferred, as it can be obstructed by an adjacent container C. Likewise, some problem may be experienced by grasping the corner casting 67 at top aperture 67*c***. Typically, a downwardly extending member, such as a twist lock, can be bent when an equalizer is being disengaged.

With respect to FIG. 6, it should be noted that latch mechanism 64 is provided with a lower gathering surface 75 and a bottom step 76. Gathering surface 75 engages the container at its upper corner and prevents relative end to end movement. Likewise, the upper aperture of the corner block 67 is penetrated by a downwardly extending lug or pawl 78. Pawl 78, when penetrating the upper aperture of corner casting 67, effects horizontal registry of the equalizer into container $C_{41}$. Step 76 provides a resting surface for the equalizer when it is stowed, either shipboard or dock side.

Referring back to FIG. 3, it will be noted that each equalizer E includes four hold downs 85. As will hereinafter more fully appear, hold downs 85 function to secure adjacent containers not in the module. This securing can occur, even though the adjacent containers are not of the same height. The operation of these respective hold downs 85 can be best seen by referring to FIG. 7, which figure illustrates in cutaway detail a typical hold down 85.

Referring to FIG. 7, a hold down bracket 86 is mounted for sliding up and down movement at each corner of equalizer E, the particular hold down 85 here illustrated being at the juncture of side member 41 and end member 43 of equalizer E. Member 86 is U-shaped in section and includes a pivotally mounted hold down bar 87 mounted at pivot 88. Bar 87 can pivot from a depending and downwardly extending pinned registry at transpiercing aperture 90 to maintain the bar in a lower position. By pivoting the bar 87 to an upwardly extending position at a pinned registry at transpiercing apertures 91, bar 87 may be maintained in a raised vertical position (see silhouette of bar 87 in broken lines). It should be noted that the position of bar 87 in member 86 must be adjusted manually in anticipation of the height differential. This manual adjust typically occurs dockside.

When bar 87 is in the lowered position (shown in solid lines), equalizer E at each of its corners can hold down adjacent containers to the side of equalizer E at their respective corner castings. (See, for example, containers $C_{44}$ of FIG. 2.) When bar 87 is in the raised position, the lower surface of member 86 can hold down adjacent containers to the side of equalizer E at their respective corner castings. In this latter case the adjacent containers can be higher than the groups of containers on which an equalizer E rests (see, for example, container $C_{48}$ in FIG. 2).

Having described the hold down member, the function of the ratchet mechanism can now be set forth. This ratchet mechanism functions to provide precise vertical adjustment of the hold down mechanism to the particular height of the adjacent container being stabilized. In the hold down function, the ratchet mechanism seeks the lowest restraining position for adjacent containers. This function is described below.

Assume an equalizer E is placed upon a stack of containers. As it is being placed upon a stack of containers, a spreader D rests on top of the equalizer. The spreader D by its weight depresses reciprocating rod 63. Reciprocating rod 63 in turn causes shaft 60 to undergo clockside rotation. Specifically, shaft 60 rotates a crank attached to bar 93. Bar 93 through pawl 94 retracts a spring loaded ratchet pawl 96. Pawl 96 when retracted removes its cam surface 97 from the ratchet. Thus, when an equalizer E is being handled by a spreader D, the hold down member may reciprocate downwardly or upwardly without restraint while the equalizer is being loaded in place.

Where, however, the spreader D releases an equalizer E, counterclockwise rotation of shaft 60 will occur. This counterclockwise rotation will be urged by the mass of the respective hooks 66, their springs 71, and the tension force of the spring 100 on ratchet 96. Ratchet 96 will reciprocate inwardly and towards member 86. Upward movement of member 86 will be restrained. A firm and downward force will exist on any container adjacent to the equalizers E.

Referring to FIG. 2, it will thus be seen that the four upward corners of containers $C_{44}$ are restrained. Hold downs 85 from equalizer $E_1$ restrain vertical upward movement at the corner castings of the port side of container $C_{44}$. Likewise, hold downs 85 from equalizer $E_2$ restrain vertical upward movement at the corner castings of the starboard side of container $C_{44}$.

It can thus be seen that the respective side hold downs 85 function to add stability to intervening columns of containers between respective equalizers, $E_1$ and $E_2$ on one hand, and $E_2$ and $E_3$ on the other hand. As relative vertical upward movement is prevented at the intermediate columns of containers, these columns are restrained from a toppling motion. The only way that the columns of containers can move upwardly and away from the respective hatchcovers B is to lift the entire weight of all of the respective containers attached to each of the equalizers E. The intermediate columns of containers between the respective modules are thus stabilized by the disclosed equalizers E at their respective hold downs 85.

Assuming that the row of containers illustrated in FIG. 2 is either 9 across, or 10 across, equalizer $E_1$ and $E_2$ may have to directly abut one another. Hold downs 85 are therefore removably attachable from side members 41, 42 of equalizer E.

Figure 4:
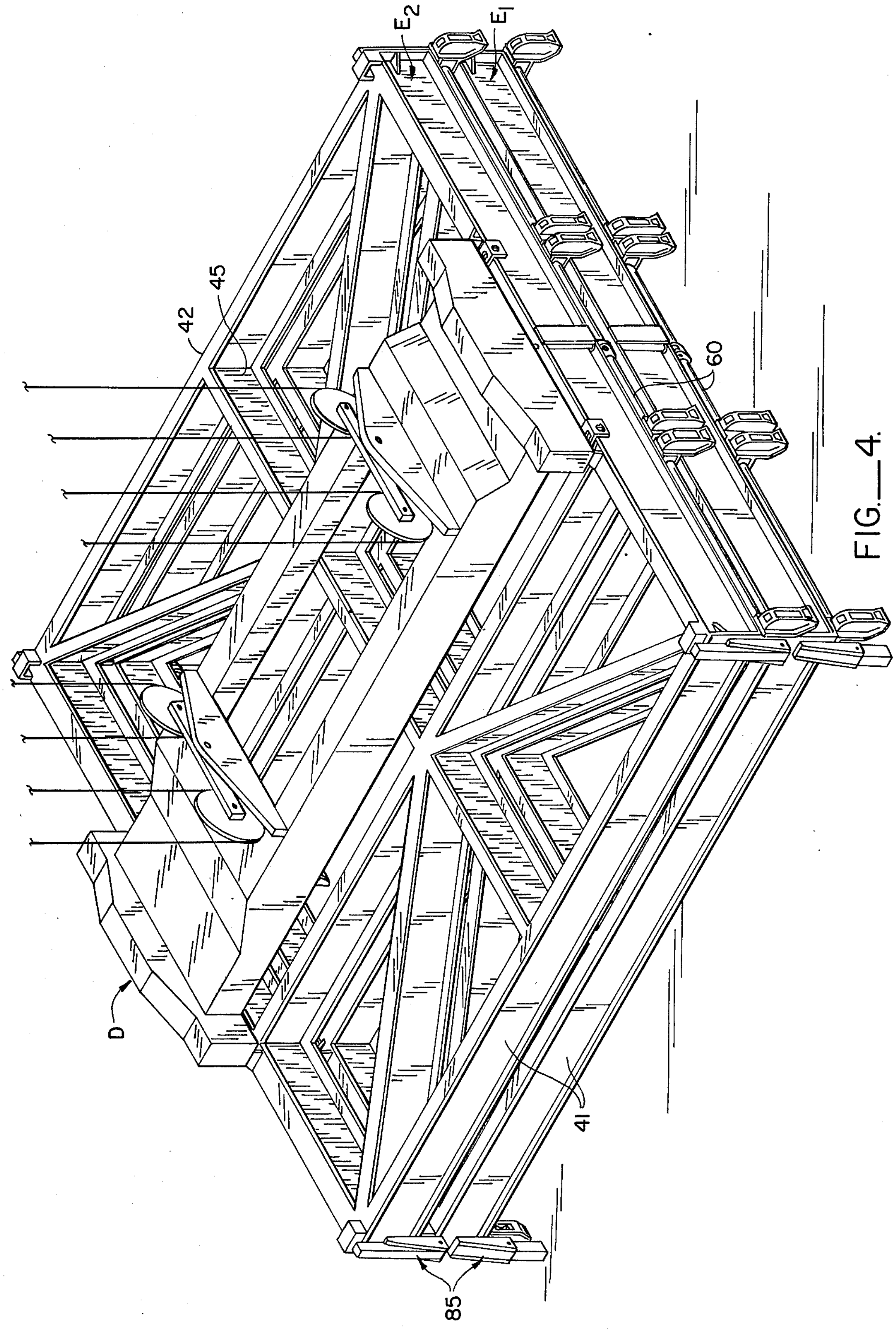
FIG. 4 is a perspective similar to FIG. 3 showing an equalizer removed from containers and about to be stowed in nesting relationship on another equalizer in a shoreside or deck storage disposition.

Referring to FIG. 4, dockside stowage of the equalizers E is illustrated. Specifically, equalizers $E_1$ and $E_2$ are shown stacked one upon another resting upon their respective latch mechanism 65.

It will be noted that the respective equalizers rest one upon another. Thus it is possible to stack the equalizers of this invention in a shoreside stack consuming a minimal amount of space. Stowage of the equalizers in either a discrete portion of a ship or a discrete portion of a yard is therefore possible in a convenient overlying and nested disposition.

The equalizers here illustrated are shown holding down containers. Such commercial containers, however, come in many discrete lengths. According to the invention here shown, each length of container requires its own length of equalizer. No telescoping of the equalizers to meet differing lengths of containers is here illustrated. However, should it be desired, it is believed obvious to one skilled in the art to provide a telescoping variability in the equalizer length to accommodate varying lengths of container with the same equalizer. Similarly, other variations can be made in this invention without departing from the spirit thereof.

What is claimed is:

1. A deck container restraint system for resisting static and dynamic loading forces on deck loaded discrete cargo containers resulting from at least the rolling motion of a ship at sea comprising: a plurality of at least nine cargo containers; said containers having at least a first tier of three immediately side by side containers resting on said deck; means on said deck for restraining at least side to side movement of said containers relative to said deck; said containers having at least a second tier of three immediately side by side containers resting on said first tier, each container on said second tier resting upon and vertically supported by a container at said first tier; means for restraining at least side to side relative movement of the containers of said second tier relative to the underlying and supporting containers of said first tier on and attached to only the interface between said first and second tiers; said containers having a third tier of three immediately adjacent side by side containers; means for restraining at least side to side relative movement of the containers of said third tier relative to the underlying and supporting containers of said second tier on and attached to only the interface between said second and third tiers; means for restraining vertical relative movement of the containers of an overlying tier relative to the containers of an underlying tier on one of said interfaces, and, an equalizer, placed over at least three of said side by side containers of said highest tier, said equalizer removably attachable to the upper portion of said highest tier of containers for attaching all said highest tier of containers together in fixed side-by-side relation for restraining side to side and vertical relative movement of at least one of said containers of said highest tier relative to all of the other containers of said highest tier, said equalizer on and attached only to the uppermost and highest tier of containers and said equalizer and said uppermost and highest tier of said containers having no vertically tied attachment to the deck.

2. The deck container restraint system of claim 1 and including means on said deck for restraining vertical relative movement of said containers relative to said deck.

3. A deck container restraint system according to claim 1 and including means on said equalizer for remotely releasing and detaching said side by side containers of said highest tier from said equalizer.

4. A process for loading deck containers for restraint from toppling overboard from a deck loaded disposition on a rolling ship comprising the steps of: providing on the deck of said ship a plurality of restraint members for restraining a first tier of at least three immediately side by side containers from both vertical and horizontal movement with respect to said deck; loading a first tier of at least three side by side containers on said restraint members; loading a second tier of at least three side by side containers, each of said containers of said second tier being supported on a container of said first tier; providing first means at the interface of said first and second tiers of containers to prevent both vertical and horizontal relative movement between said containers, said provided first means being independent of attachment to said deck; providing at the top of said second tier of containers second means for restraining a third tier of containers against side to side movement only when a third tier of containers is loaded with individual container members each immediately on top of an underlying container member of said second tier, said provided second means being independent of attachment to said deck; loading a third and fourth tier of containers on top of said second tier of containers with underlying and overlying container pairs of said third and fourth tier being vertically tied together and horizontally tied together independent of attachment to said deck; providing an equalizer for placement over at least three side by side containers at the top of said fourth tier of containers; and, placing and fastening said equalizer on top of said fourth tier of containers to restrain side to side and relative vertical movement of at least one container on said fourth tier relative to all of the other containers on said fourth tier, said equalizer fastened to said containers and having no vertical tensive tie attachment between said equalizer or said fourth tier of containers and said deck.

5. A deck container restraint system for resisting static and dynamic loading forces on deck loaded discrete cargo containers against at least the rolling motion of a ship at sea comprising: a plurality of at least twelve cargo containers; said containers having a first tier of three immediately side by side containers resting on said deck; first means for restraining side to side movement of said containers and vertical movement of said containers in said first tier relative to said deck; said containers having a second tier of three immediately side by side containers resting on said first tier, each container on said second tier resting upon and vertically supported by a container at said first tier; second means for restraining side to side and vertical relative movement of the containers of said second tier relative to the underlying and supporting containers of said first tier, said second means independent of direct attachment to said deck; said containers having at least a third tier of three immediately side by side containers resting on said second tier, each container on said third tier resting upon and vertically supported by a container of said second tier; third means for restraining at least side to side relative movement of the containers of said third tier relative to the underlying and supporting containers of said second tier, said third means independent of direct attachment to said deck; said containers having a fourth tier of three immediately side by side containers resting on said third tier, each container on said fourth tier resting on and vertically supported by a container from said third tier; fourth means for restraining side to side and vertical relative movement of the containers of said fourth tier relative to the underlying and supporting containers of said third tier, said fourth means independent of direct attachment to said deck; and an equalizer placed over three of the side by side containers of the fourth tier and attached to said containers to restrain all relative movement vertically and horizontally among the containers of said top tier of containers, said equalizer and said top tier of said containers having no vertical tensive tie to said deck.

6. In combination with a ship having a deck, an equalizer constituting a restraint mechanism for restraining a plurality of at least three side by side cargo containers, each of said cargo containers having at least four upward castings defining holes for loading and unloading by a container lifting spreader, said equalizer comprising: a frame for overlying said three side by side containers at least at the four upward castings of each of said three side by side containers, said frame having sufficient strength to restrain side to side and vertical movement of any one of said three side by side containers relative to said other side by side containers; at least twelve latching means, each latching mean comprising means for remotely engaging said hole defined by said castings to restrain movement of said engaged casting; said latching means supported by said frame in arrays of at least four for grasping a container at said upper castings to restrain vertical and horizontal movement of said container relative to said frame; said frame further supporting each of said arrays of latch mechanisms to simultaneously grasp said three side by side containers to restrain vertical or horizontal movement of at least one of said side by side containers relative to said remaining side by side containers; lifting means on said equalizer, said lifting means upwardly exposed and adapted for engagement to said container lifting spreader whereby said equalizer may be remotely lifted or released by said container lifting spreader; and, first actuating means operatively connected to each said latching means for disengaging said latching means upon contact of said equalizer to a lifting spreader and engaging said latching means upon release of said equalizer from a lifting spreader whereby said equalizer may remotely attach to said three side by side containers upon release from said lifting spreader.

7. The combination of claim 6 and including hold down means attached to the sides of said frame, said hold down means for overlying a container immediately to the side of said three side by side cargo containers; second actuating means operatively connected to each said hold down means for permitting vertical up and down adjustment of said hold down means upon contact of said equalizer to a lifting spreader and permitting vertical downward movement only of said hold down means upon release of a lifting spreader from said equalizer.

8. A deck container restraint system for resisting static and dynamic loading forces on deck loaded discrete cargo containers against at least the rolling motion of a ship at sea comprising: first and second modules, each said module having at least three tiers including a lowermost tier of at least three immediately side by side containers resting on said deck, an intermediate tier of at least three immediately side by side containers overlying said lowermost tier, each container on said intermediate tier overlying a container of said lowermost tier, and an uppermost tier of at least three immediately side by side containers overlying said intermediate tier, each container on said uppermost tier overlying a container of said intermediate tier, each said module further having means for restraining at least side to side movement of said containers of said lowermost tier relative to said deck, means for restraining at least side to side movement of containers of said intermediate tier relative to the underlying containers of said lowermost tier, means for restraining at least side to side movement of containers of said uppermost tier relative to the underlying containers of said intermediate tier, and an equalizer placed over at least three of said side by side containers of said uppermost tier restraining relative vertical and horizontal movement among said containers of said uppermost tier; a column of containers between said first and second modules, said column having said first module on one side thereof and said second module on the other side thereof; and, first and second means on said first and second equalizers respectively at the sides thereof for restraining the topmost containers of said column against vertical movement, whereby said column of containers between said modules is restrained from toppling due to said rolling motion of said ship.

9. The invention of claim 8 and wherein said first module is higher than said second module.

10. The invention of claim 8 and wherein said column of containers between said first and second modules has a different height than that of at least one of said modules.

11. The invention of claim 8 and wherein at least one of said modules has a fourth tier immediately above said intermediate tier and immediately below said uppermost tier, and means for restraining at least side to side movement of said containers of said fouth tier relative to said containers of said intermediate tier.

12. The invention of claim 8 and wherein at least one of said modules has means for preventing relative vertical movement between the containers of said intermediate tier and the containers of said lowermost tier.

* * * * *